May 8, 1928.

W. M. SCOTT

1,668,735

CIRCUIT BREAKER CONTROL

Filed May 12, 1924      5 Sheets-Sheet 1

FIG. 1

INVENTOR
William M. Scott
BY Cornelius D. Ehret
his ATTORNEY

May 8, 1928.  1,668,735
W. M. SCOTT
CIRCUIT BREAKER CONTROL
Filed May 12, 1924   5 Sheets-Sheet 4

INVENTOR
William M. Scott
BY Cornelius L. Ehret
his ATTORNEY

May 8, 1928.  1,668,735
W. M. SCOTT
CIRCUIT BREAKER CONTROL
Filed May 12, 1924  5 Sheets-Sheet 5

INVENTOR
William M. Scott
BY Cornelius D. Ehret
his ATTORNEY

Patented May 8, 1928.

1,668,735

UNITED STATES PATENT OFFICE.

WILLIAM M. SCOTT, OF TREDYFFRIN TOWNSHIP, CHESTER COUNTY, PENNSYLVANIA.

CIRCUIT BREAKER CONTROL.

Application filed May 12, 1924. Serial No. 712,581.

My invention relates to switching mechanism, and more particularly automatic circuit breaking mechanism, for controlling circuits traversed by current utilized for power, lighting and other purposes.

In accordance with my invention a main switch, or an automatic circuit breaker, is moved to normal or circuit-closing position, after it has been opened, or tripped in response to overload or other abnormal electrical condition, by an electro-motive device controlled by a control switch which is controlled by fluid, preferably hydraulic, control mechanism which permits the control switch to be moved a plurality of times in succession to position causing operation of the electro-motive device to effect a similar number of re-closures of the main switch or automatic circuit breaker, and which then retains the control switch in position preventing operation of the electro-motive device in response to the cumulative effect upon a piston or equivalent of successive masses of fluid forced by or applied under control of successive movements of another piston or equivalent.

My invention resides in a system and apparatus of the character hereinafter described and claimed.

For an illustration of one of the various forms my invention may take, reference is to be had to the accompanying drawings, in which.

Figure 1:
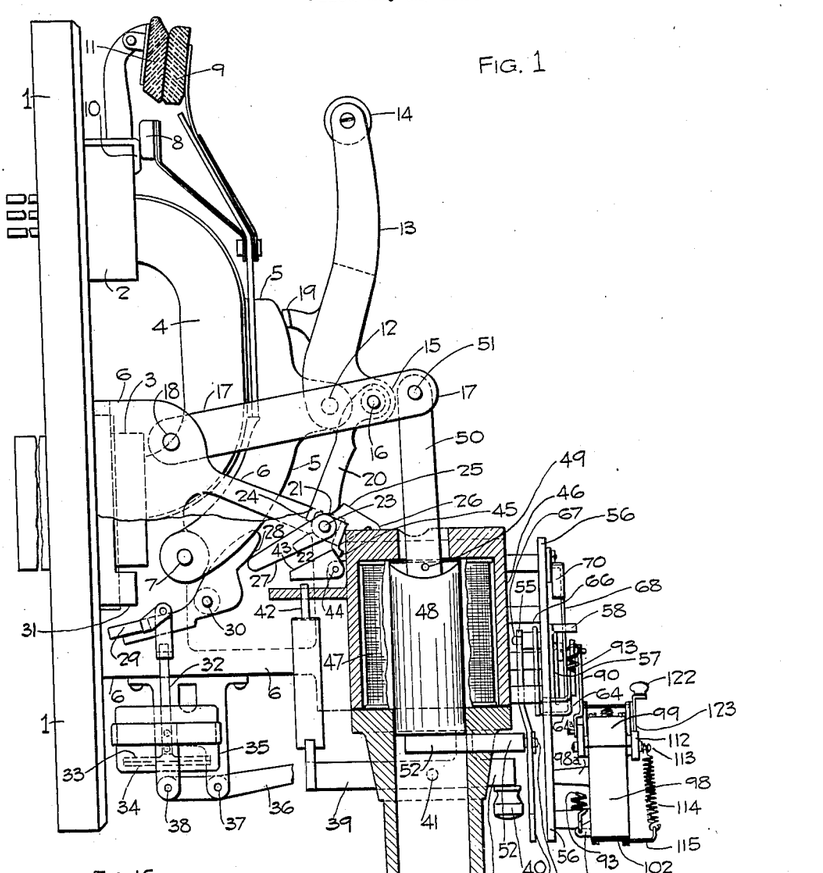
Fig. 1 is a side elevational view, partly in vertical section, of apparatus embodying my invention.
Figure 2:
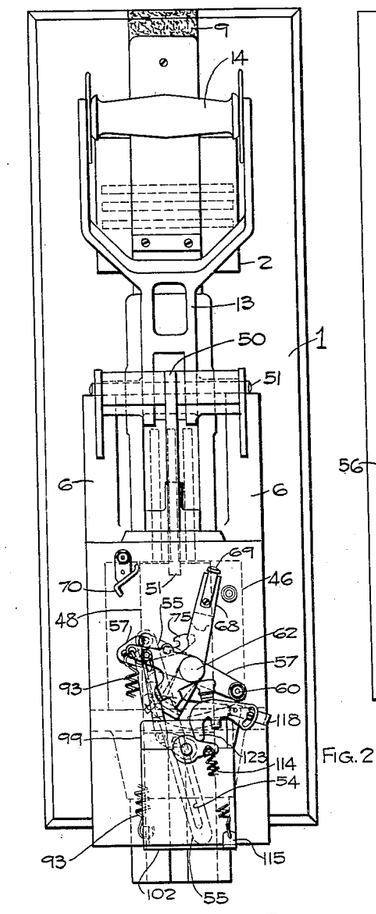
Fig. 2 is a front elevational view of the apparatus shown in Fig. 1.

Referring to Figs. 1 and 2, upon a base 1, of insulating material, are secured the main terminal blocks 2 and 3 of an automatic circuit breaker whose laminated movable contact member is adapted to engage and bridge the terminals 2 and 3 to effect circuit closure. The member 4 is carried by the arm 5 pivoted to the bracket or housing 6 at 7.

Movable with the contact member 4 are the shunt contacts 8 and 9, of metal and carbon respectively, co-acting with the stationary shunt contacts 10 and 11, respectively, of metal and carbon respectively, for taking the arc upon circuit rupture.

Pivoted to the arm 5 at 12 is the operating lever 13 provided with the operator's handle 14 and having the extension 15 constituting a toggle link pivoted at 16 to the toggle link 17 pivoted to the housing at 18. In the circuit closing-position indicated in Fig. 1 the center of the pivot 12 lies slightly above a line joining the centers of pivots 16 and 18, the toggle comprising the links 15 and 17 being therefore extended but slightly under-travelled, the lug 19 upon lever 13 engaging the arm 5 to limit the relative movement of the parts. The contact member 4 is locked in circuit-closing position by the dog or thrust latch 20 pivoted at 16 and thrusting at its lower end at 21 against the roller 22 pivoted at 23 upon the housing 6, the point of engagement between the latch 20 and roller 22 in the locking position being slightly to the right of the line joining the centers of the pivots 16 and 23, a lug 24 upon the latch 20 engaging the roller 22 to prevent the latch from over-travelling farther than indicated. Pivoted to the housing 6 at 23 is the latch actuator 25 whose clockwise movement is limited by its lug 26 engaging with any suitable fixed member as the housing of the solenoid later described. The latch actuator has the tail 27 disposed adjacent the tail 28 upon the armature 29 pivoted to the housing at 30 and co-acting with the poles 31 of the U-shaped core embracing the main terminal 3, or the lead thereto, and magnetized by the current passing therethrough, to attract the armature 29 upwardly and thereby causing counterclockwise rotation of the latch actuator 25 to actuate the latch 20 in clockwise direction to trip the circuit breaker which then flies to open circuit position.

There may be applied to the armature 29 through the connecting rod 32 the movable sucker element 33 co-acting with the stationary sucker element 34 disposed in the pot 35. The normal position of the armature 29 with respect to the poles 31 is determined by the position of the lever 36 pivoted at 37 and to which is pivoted at 38 a holder for the housing 35 and the fixed sucker element 34. Adjustment of the lever 36 therefore determines at what current strength the circuit breaker will be tripped.

The latch actuator 25 may also be manually operated to effect manual tripping of the circuit breaker, by the lever 39, provided with the operating handle 40 and pivoted at 41 to effect upward movement of the pin 42 which engages and actuates the member 43 pivoted at 44 to engage and actuate the lug 45 upon the latch actuator 25.

Carried by the housing 6 is the magnetizable jacket or housing 46 of a solenoid within whose winding 47 is movable the core 48 to whose upper end there is pivoted at 49 the link 50 pivoted to the toggle link 17 at 51.

In the position of the parts indicated in Fig. 1 the core 48 is in its uppermost and fully attracted position to which it has been theretofore attracted upon energization of the winding 47, the upward movement of the core 48 causing counterclockwise movement of the toggle link 17 and thereby closing and latching the circuit breaker in normal or circuit-closing position, and holding the core 48 in its elevated position indicated.

Secured to the lower end of the core 48 is the horizontally extending member 52 terminating in a pin 53 which engages in the slot 54 in the link 55, Figs. 1, 2, 3, 4, 5.

Secured to either or both of the housings 6 and 46 is the plate or base 56, of insulating material, carrying the control mechanism.

Secured upon the right or front face of the base 56, as viewed in Fig. 1, is the plate or member 57 having the outstanding lugs 58 and 59 and carrying the circuit terminal or binding post 60. Carried by the member 57 is the shaft 61 having at its front end the head 62 and on its rear end on the opposite side of the base 56 the nut 63.

Figures 8, 9:
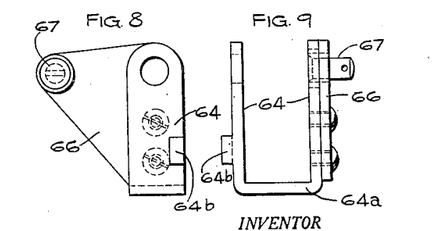
Figs. 8 and 9 are front and side elevational views, respectively, of the switch arm actuator.

Pivoted upon the shaft 61 is the U-shaped member 64, shown separately in Figs. 8 and 9, the legs of the member 64 being disposed on opposite sides of the base 56 and the member 64ª which joins them passing freely through the aperture 65. Secured upon the rear leg of the member 64 is the plate 66 which carries the pin 67 to which is pivoted the aforesaid link 55 associated with the solenoid core.

Figure 6:
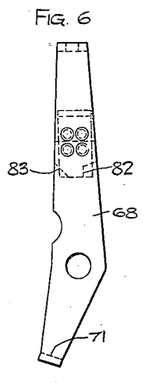
Figs. 6 and 7 are front and side elevational views, respectively of the control switch arm.
Figure 7:
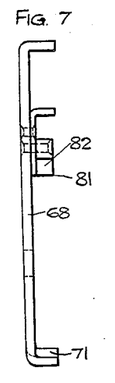

Pivoted upon the shaft 61 independently of the member 64, is the movable contact arm 68, shown separately in Figs. 6 and 7, of the solenoid controlling switch. Carried by the contact arm 68 is the yielding terminal 69, in electrical communication with the binding post 60 and adapted to engage and make electrical connection with the stationary contact 70 of the control switch carried by the base 56. At its lower end the contact arm 68 is provided with the inwardly projecting lug 71 disposed between the ends 72 of the spring 73 coiled about the shaft 61. Between the spring ends 72 is disposed also the member 64ª which connects the legs of the member 64, whose rotation upon the shaft 61 puts the spring 73 under tension which is transmitted to the contact arm 68 and moves it under circumstances hereinafter described.

Figure 3:
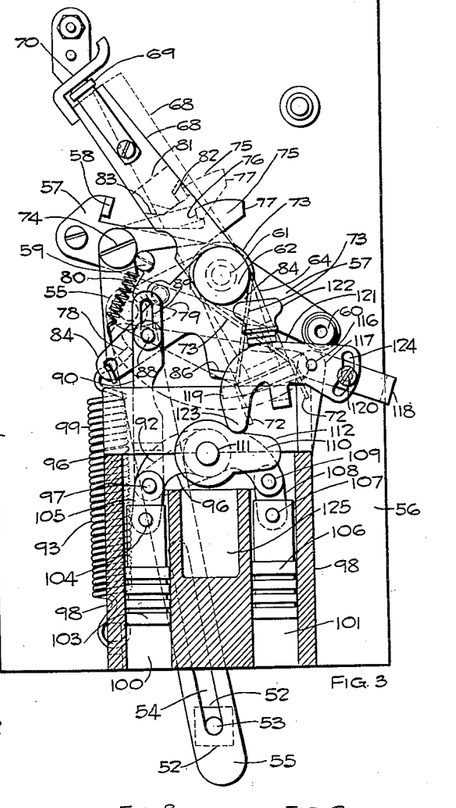
Fig. 3 is a front elevational view, partly in vertical section, of the control switch and the control mechanism therefor, with the control switch in the circuit-closing position.
Figures 4, 5:
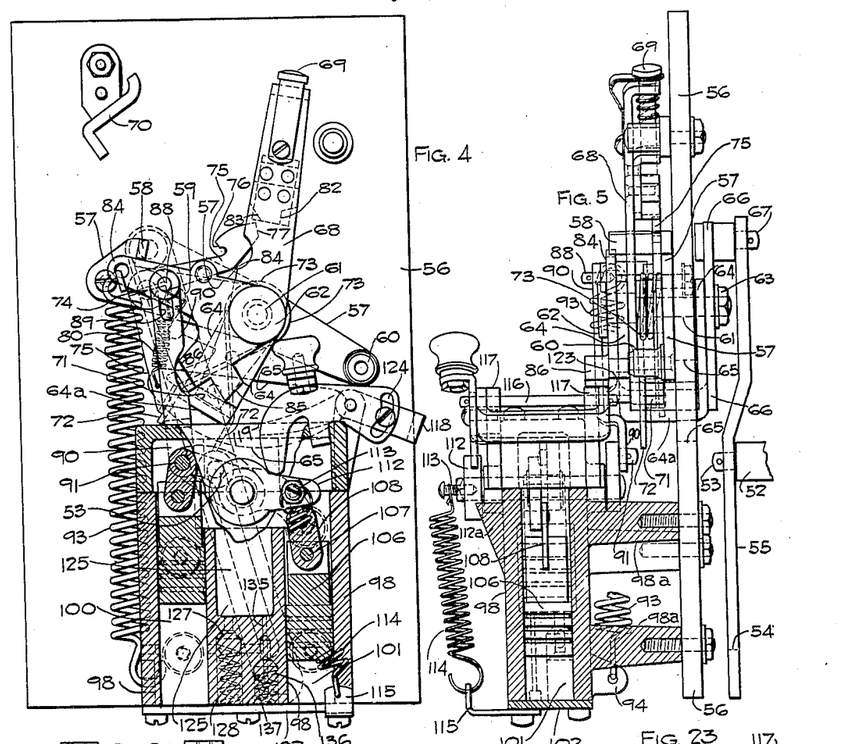
Fig. 4 is a front elevational view, partly in vertical section, of the control switch and the control mechanism therefor, with the control switch in open circuit position.
Fig. 5 is a side elevational view, partly in vertical section, with the parts in the position indicated in Fig. 4.

Pivoted upon the member 57 at 74 is the latch member 75 having the latch hook 76, the abutting latch surface 77 and lugs 78 and 79.

Figures 10, 11:
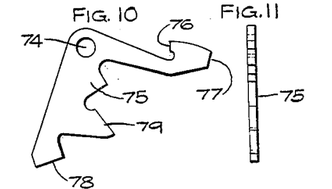
Figs. 10 and 11 are front and edge views, respectively, of the switch arm latching member.

Secured to the lugs or post 59 on the member 57 is a spring 80 attached to the latch member 75 and acting thereon to tend to rotate the latch member in counterclockwise direction, as viewed in Figs. 3, 4, and 10.

Secured upon the contact arm 68 is the block 81 having the locking surface 82 adapted to be engaged and held by the hook latch 76, and having the surface 83 adapted to engage the thrust latch 77 on the latch member 75.

Figure 12:
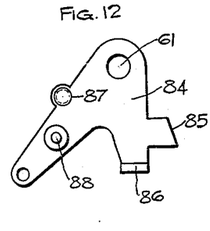
Figs. 12 and 13 are front and side elevational views, respectively, of the member controlling the latch and the control mechanism.
Figure 13:
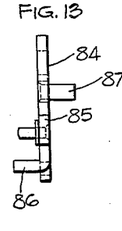
Figure 14:
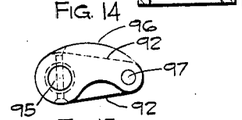
Figs. 14 and 15 are, respectively, end elevational and plan views of a piston operating member.
Figure 15:
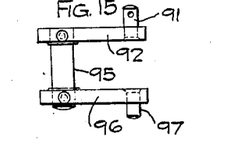
Figure 16:
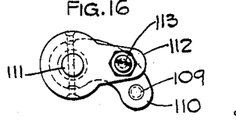
Figs. 16 and 17 are, respectively, elevational and plan views of a piston operated member.
Figure 17:
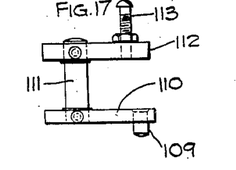

Independently pivoted upon the shaft 61, and limited as to its clockwise movement by the lug 58 on member 57, is the member 84, shown separately in Figs. 12 and 13, having the lug 85 engaged by the lug 64$^b$ on member 64, and the outwardly projecting lug 86. The member 84 is further provided with a pin or lug 87 co-acting with the lug 79 of the latch member 75. It is further provided with a pin 88 engaging in the slot 89 in the upper end of the link 90 whose lower end is pivoted to the pin 91 on the crank arm 92 of the crank members shown separately in Figs. 14 and 15 and as shown in plan in Fig. 31.

A spring 93 is connected at its one end to the member 84 and at its other end to the lug 94 on the cylinder housing, to oppose clockwise movement of the member 84, as viewed in Figs. 3 and 4.

Figure 31:
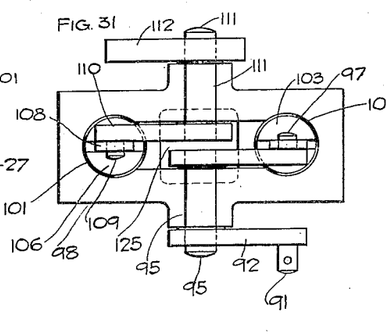
Fig. 31 is a top plan view of the cylinder housing with the pistons therein and connected to the members shown in Figs. 15 and 17.

The crank arm 92 is secured upon the shaft 95 to whose opposite end is secured the crank arm 96 carrying the pivot pin 97. The shaft 95 has a bearing formed in the upper end of the cylinder housing 98 and its cap or end closure member 99 secured thereto by screws or the like. The member 98 is secured to and spaced from the base 56 by its rearwardly extending lugs 98$^a$.

Within the cylinder block 98 are bored two cylinders 100 and 101 closed at their lower ends by the closure member 102 secured to the block 98 by screws or the like.

Figures 20, 21, 22, 25, 26:
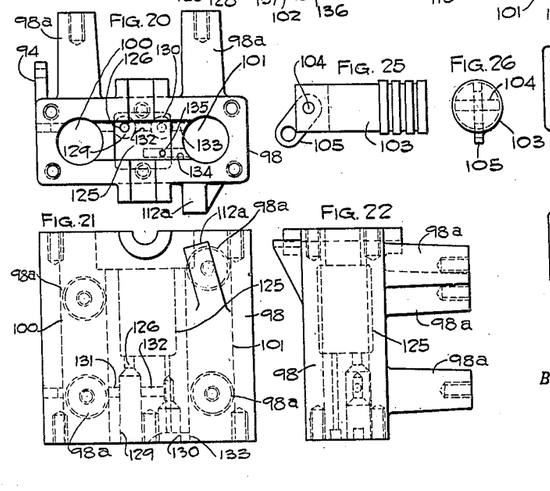
Figs. 20, 21 and 22 are, respectively, top plan, front and side elevational views of the cylinder housing.
Figs. 25 and 26 are, respectively, side and end views of a piston.
Figures 23, 24:
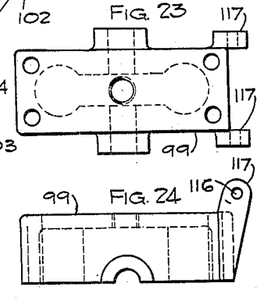
Figs. 23 and 24 are, respectively, top plan and front elevational views of the end closure member for the cylinder housing.

Movable within the cylinder 100 is the piston or plunger 103, shown separately in Figs. 25 and 26, and having pivoted to its upper end at 104 the link 105 pivoted upon the aforesaid pin 97 on the crank arm 96 which latter is disposed within the housing structure while its companion, 92, is disposed outside of the housing structure whereby the piston 103 is connected through the aforesaid link 90, with lost motion, with the member 84.

Movable in the cylinder 101 is the piston 106 to which there is pivoted at 107 the link 108 whose upper end is pivoted on the pin 109 on the crank arm 110 disposed within the housing structure and secured upon the shaft 111 co-axial with shaft 95 and having a bearing within the cylinder block 98 and its cover member 99. Disposed on the outside of the block 98 and secured upon the shaft 111 is the second crank arm 112 carrying the pin or screw 113 to which is secured one end of the spring 114 whose other end is secured to the bracket 115 secured to the closure member 102. The spring pulls downwardly on the outer end of the arm 112 whose arcuate movement is limited by the lug 112$^a$ on the housing 98.

Figure 18:
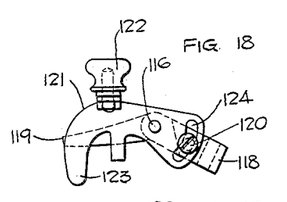
Figs. 18 and 19 are elevational and plan views, respectively, of a member controlling the member shown in Fig. 12.
Figure 19:
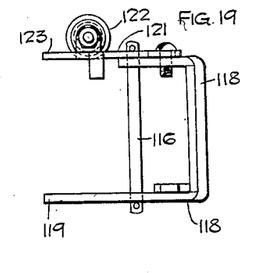

Pivoted at 116, in the lugs 117 on the cap 99, is the U-shaped member 118, shown separately in Figs. 18 and 19, having disposed at the rear of the cylinder block the locking lug or latch 119 adapted to be disposed in the path of the lug 86 on the member 84 to prevent its counterclockwise rotation, as viewed in Figs. 3 and 4, under circumstances hereinafter described. Pivoted at 116 and secured to the member 118 by the screw 120 is the arm 121, carrying the operator's handle 122, and having its end or lug 123 disposed in the path of travel of the crank arm 112. The member 121 is provided with an arcuate slot 124 through which screw 120 extends for effecting suitable angular adjustment of the member 123 with respect to the member 118 and its latch member 119.

Figure 27:
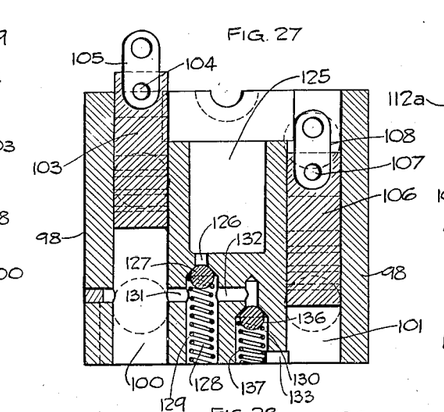
Fig. 27 is a vertical sectional view of the cylinder housing taken on the line 27—27 of Fig. 28.

In the block 98 between the cylinders 100 and 101 is the chamber 125 with which communicates the passage 126 normally held closed by the ball valve 127, Fig. 27, forced upwardly against its seat by the spring 128 disposed in the chamber 129 which with the chamber 130 is closed at its lower end by the closure member 102. The cylinder 100 communicates through the passage 131 with the chamber 129 which in turn communicates with the chamber 130 through the passage 132, and the cylinder 101 communicates with the chamber 130 through the passage 133.

Figure 28:
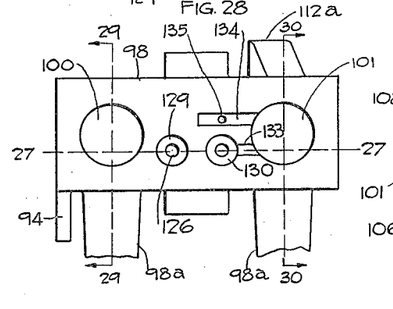
Fig. 28 is a bottom plan view of the housing shown in Fig. 27.
Figure 29:
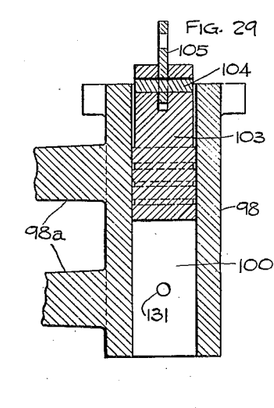
Fig. 29 is a vertical sectional view taken on the line 29—29 of Fig. 28, with the piston in position.
Figure 30:
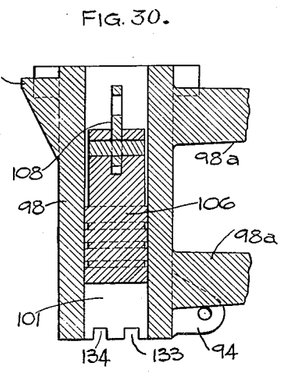
Fig. 30 is a vertical sectional view on the line 30—30 of Fig. 28, with the piston in position.

In the lower end of the block 98 communicating with the cylinder 101 is the channel 134, Figs. 20 and 28, communicating by passage 135 with the chamber 125. In the chamber 130 is the ball valve 136 held upwardly against its seat by the spring 137.

Disposed in the cylinders and the chamber 125 and their communicating passages is a suitable volume of liquid, as oil, serving as a medium by which force is transmitted by piston 103 to piston 106.

Figure 32:
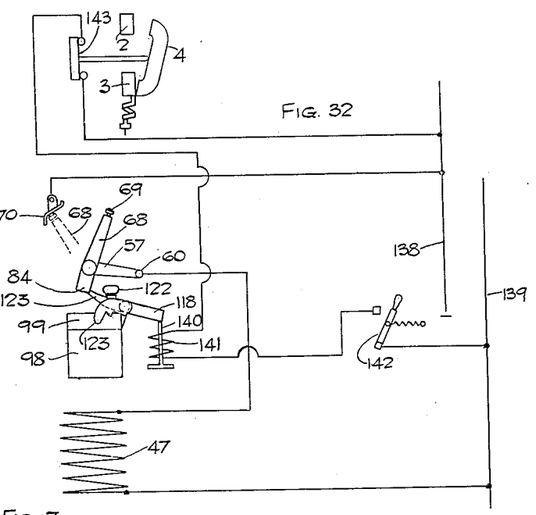
Fig. 32 is a diagrammatic view of the electrical control system.

Referring to Fig. 32, control current is supplied by the conductors 138 and 139 connecting with any suitable source of current, not shown. One terminal of the solenoid winding 47 is connected with conductor 139 and the other terminal to the binding post 60 and switch contact 69 is adapted to connect with the stationary switch contact 70 which connects with the conductor 138, whereby, when the control switch 68 is closed the solenoid winding 47 will be energized.

There may be associated with the member 118 the core 140 of a solenoid whose winding 141 has its one terminal connected through the switch 142 with the conductor 139, and its other terminal connected through the switch 143 with the conductor 138. The switch 143 is closed only when the main circuit breaker is in open circuit position, that is, when its movable contact member 4 is out of engagement with the main terminals 2 and 3, as indicated in Fig. 32. With the switch 143 closed, and upon closing the operator's switch 142, the solenoid 141 will be energized, drawing its core 140 upwardly causing counterclockwise movement of the detent or latch 123 to effect release and circuit closure of the control switch 69. It will be understood that the solenoid 141 and its circuit are not essential, but may be applied when it is desired to actuate the detent 123 from a distant point at which the switch 142 is located, in lieu of operating the member 123 directly by operation of the handle 122.

The operation is as follows:

On closure of the control switch 68, after or in response to the opening of the circuit breaker, either when tripped manually or automatically by attraction of the armature 29, with the solenoid core 48 in its lowermost position and extending only partly into the winding 47, that winding will be energized, attracting the core 48 upwardly causing closure and latching of the circuit breaker. In its upward movement the core 48 carries the pin 53 upwardly, moving the link 55 and pin 67 upwardly thereby rotating the member 64 in clockwise direction as viewed in Fig. 3, winding the spring 73, and causing the lug 64$^b$ on member 64 to actuate the lug 85 on member 84 causing the latter also to rotate in clockwise direction and place the spring 93 under greater and greater tension. After this movement has progressed somewhat the lug or pin 87 upon member 84, which has been in engagement with the lug 79 on the latch member 75 holding the hook latch 76 in opposition to spring 80, is withdrawn from lug 79 and the spring 80 rotates the hook latch 76 in counterclockwise direction, as viewed in Fig. 3, causing it to engage the latch lug 82 upon the switch arm 68, thereby restraining it in the circuit-closing position indicated in Fig. 3. As the movement of the member 64 continues the pin 88 on the member 84 reaches the upper end of the slot in the link 90, thereby raising the piston 103, which by suction draws oil into the cylinder 101 through the passage 131 from chamber 125, the suction causing oil to pass from chamber 125 past the ball valve 127 in opposition to spring 128. As the movement of member 64 continues, increasing the tensions of springs 73 and 93, the member 64$^a$ engages the lug 78 on the latch member 75 rotating it in clockwise direction, as viewed in Fig. 3, in opposition to its spring 80, thereby withdrawing the hook latch 76 from the latch lug 82 thereby freeing the contact arm 68 which is accordingly tripped and under the influence of the previously tensioned spring 73 flies to open circuit position indicated in Fig. 4, carrying the block 81 on the switch arm 68 past the end of the latch member 75, these movements being so timed that the opening of circuit by switch arm 68 coincides with closure of circuit breaker 4. In so moving the switch arm 68 breaks the circuit of the winding 47 which accordingly becomes de-energized but the circuit breaker latch 20 holds the core 48 in its uppermost position indicated in Fig. 1, thereby also holding the member 64 in the position to which it has been moved by the core 48 and the member 64 remains in this position so long as the circuit breaker continues to be locked in circuit closing position by the latch 20, and the member 64$^b$ holds the member 84 at the upper limit of its travel against the tension of the spring 93. The parts will remain in the position described until an overload or other abnormal electrical condition occurs in the circuit controlled by the circuit breaker, whereupon it will be tripped by attraction of the armature 29 which actuates the latch 20, and such actuation of the latch 20 allows the core 48 to fall, carrying the pin 53 downwardly in the slot 54 in the link 55, until the pin 53, engaging at the lower end of the slot 54, carries the link 55 downwardly and thereby rotating the member 64 in counterclockwise direction back to its normal position. In so returning to its normal position the member 64 is withdrawn from the lug 78 on the latch plate 75 permitting the spring 80 to contract and rotate the member 75 in counterclockwise direction as viewed in Fig. 3, bringing its detent end 77 into the path of the detent surface 83 on the switch arm 68, thereby locking the switch arm 68 in open circuit position. Upon return of the member 64 to its original position, as last described, the spring 93 contracts thereby rotating the member 84 in counterclockwise direction, following the member 64, and the pin 88 on the member 84 engages the bottom of the slot 89 in the link 90 forcing the link 90 downwardly and thereby forcing the piston 103 downwardly in the cylinder 100 forcing oil ahead of it through the passage 131 through the chamber 129, passage 132, chamber 130 and passage 133 into the cylinder 101 beneath the piston 106 forcing the latter upwardly in opposition to spring 114, this upward movement of the piston 106 being accompanied by counterclockwise rotation of the crank arm 112, as viewed in Fig. 4, causing partial rotation of the member 118 and its detent 123 in clockwise direction as viewed in Fig. 4. Toward the end of the described counterclockwise movement of the member 84, the pin 87 thereon presses downwardly upon the lug 79 on the latch plate 75, withdrawing the detent 77 on the member 75 from the path of the detent surface 83 upon the switch member 68 which thereupon flies to circuit-closing position under the influence of the spring 73 which has been tensioned in suitable sense by the aforesaid counterclockwise movement of the member 64. Accordingly the circuit of the solenoid winding 47 is again closed, causing a repetition of the upward movement of the solenoid core, closing and latching the main breaker, and causing a repetition of the above described tripping of the switch arm 68 which again flies to open circuit position. The time elapsing between the opening of the circuit breaker and its closure is governed by the time required for the closing of the control circuit by the switch arm 68, and this in turn is determined by the speed of the downward movement of the plunger 103, which is controlled by the size of the orifice 132 and tension of the spring 93. If the overload or other abnormal electrical condition still obtains upon closure of the circuit breaker it will again be tripped with a repetition of the operations above described, including an upward movement of the piston 103, again drawing additional oil into the cylinder 100 from the chamber 125, the downward movement of the piston 103 forcing still more oil into the cylinder 101 and causing further upward movement of the piston 106.

And so these cycles of operations are repeated for each tripping of the main circuit breaker, with the result however that there is an accumulative effect upon the piston 106 which rises farther and farther in response to the successive trippings of the main circuit breaker, until the crank arm 112 has been rotated to such extent in counterclockwise direction, as viewed in Fig. 4, as to cause the detent 119 to come into the arcuate path of travel of the lug 86 upon the member 84, holding it locked in such position that the spring 93 is under tension, with the pin 87 removed from the lug 79 of the latch member 75, with resultant locking of the switch arm 68 in open circuit position by the detent 77 of the latch member 75. Parts will now remain indefinitely in this position, with the main circuit breaker in open circuit position until the detent 119 is rotated in counter-clockwise direction either by pressure upon the handle 122 or by closure of the operator's switch 142 whereupon the detent 119 will be withdrawn from the path of the lug 85 upon member 84, the spring 93 will contract, rotating the member 84 in counterclockwise direction causing the pin 87 on member 84 to engage the lug 79 on latch plate 75, rotating the latter in opposition to its spring 80 in counterclockwise direction to withdraw the detent 77 from the detent surface 83, thereby tripping the contact arm 68 which flies to the circuit-closing position under the influence of spring 73 resulting in closing and latching of the main circuit breaker which will remain in circuit closing position if the abnormal condition or overload no longer obtains, but which will immediately be tripped if such condition still or again exists, and the cycle of operations hereinbefore described will be repeated, the circuit breaker being prevented from closure if after a predetermined number of circuit closures within a predetermined time the abnormal condition or overload still persists.

The successive downward movements of the piston 103 are added in their effect upon the upward movement of the piston 106, and until the piston 106 has been raised a predetermined distance, the mechanism will cause successive automatic re-closures of the main circuit breaker.

The spring 114 continuously exerts a downward force upon the piston 106 and in consequence there is so long as piston 106 is elevated a constant leakage or return of oil from the cylinder 101 to the chamber 125 through the passages 134 and 135, the ball 136 held against its seat by the spring 137 preventing passage of oil from cylinder 101 through chamber 130 and passage 132 into the cylinder 100. The passage 135, for example, is made of sufficiently small cross section, with regard to the strength of the spring 114 and the viscosity of the oil involved, to cause a slow or retarded return of oil from cylinder 101 into the reservoir or chamber 125, thereby introducing into the control a time element, permitting cumulative movements of piston 106 in response to successive movements of piston 103 if occurring sufficiently rapidly or in sufficiently close succession. If however the period between successive trippings of the main circuit breaker is sufficiently long the piston 106 returns to normal position and it will require a new series of operations of the main circuit breaker to effect locking of the control switch 68 in open position.

While in the preferred example of my invention hereinbefore described oil is utilized as the control fluid, it will be understood that any other suitable liquid may be employed, or that there may be employed air, gas or other elastic fluid.

What I claim is:

1. The combination with an electric switch and a motive device therefor, of a control switch controlling said motive device, mechanism for controlling said control switch, comprising a fluid operated member, a control member controlling successive operations of said fluid operated member in response to successive operations of said switch, and means controlled by said fluid operated member and controlling said control switch.

2. The combination with an electric switch and a motive device therefor, of a control switch controlling said motive device, mechanism for controlling said control switch, comprising a fluid actuating member movable in response to movement of said switch, a fluid operated member moved an extent dependent upon the number of successive fluid actuating movements of said fluid actuating member, and means operative in response to predetermined extent of movement of said fluid operated member to effect a control of said control switch.

3. The combination with an electric switch, of means for restraining it in normal position, a motive device for restoring said switch to normal position after it has opened, mechanism for controlling said motive device comprising a fluid operated member, a control member controlling successive operations of said fluid operated member in response to successive operations of said switch, and means controlled by said fluid operated member to prevent operation of said switch to normal position by said motive device.

4. The combination with an electric switch, of means for restraining it in normal position, a motive device for restoring said switch to normal position after it has opened, mechanism for controlling said motive device comprising a fluid actuating member movable in response to movement of said switch, a fluid operated member moved an extent dependent upon the number of successive fluid actuating movements of said fluid actuating member, and means operative in response to predetermined extent of movement of said fluid operated member to prevent operation of said switch to normal position by said motive device.

5. The combination with an electric switch, of means for restraining it in normal position, a motive device for restoring said switch to normal position after it has opened, a control switch controlling said motive device mechanism for controlling said motive device comprising a fluid operated member, a control member controlling successive operations of said fluid operated member in response to successive operations of said switch, means controlled by said fluid operated member and controlling said control switch, and means for determining the time within which said last named means is controlled by said fluid operated member.

6. The combination with an electric switch and a motive device therefor, of a control switch controlling said motive device, mechanism for controlling said control switch, comprising a fluid operated member, a control member controlling successive operations of said fluid operated member in response to successive operations of said switch, means controlled by said fluid operated member to prevent operation of said control switch, and means for determining the time within which said last named means is controlled by said fluid operated member.

7. The combination with an electric switch, of means for restraining it in normal position, a motive device for restoring said switch to normal position after it has opened, mechanism for controlling said motive device comprising a fluid actuating member movable in response to movement of said switch from normal position, a fluid operated member moved an extent dependent upon the number of successive fluid actuating movements of said fluid actuating member, means operative in response to predetermined extent of movement of said fluid operated member to effect a control of said motive device, and means for determining the time within which successive movements of said fluid actuating member effects said predetermined extent of movement of said fluid operated member.

8. The combination with an electric switch, of means for restraining it in normal position, a motive device for restoring said switch to normal position after it has opened, mechanism for controlling said motive device comprising a fluid actuating member movable in response to movement of said switch from normal position, a fluid operated member moved an extent dependent upon the number of successive fluid actuating movements of said fluid actuating member, means operative in response to predetermined extent of movement of said fluid operated member to prevent operation of said switch to normal position by said motive device, and means for determining the time within which successive movements of said fluid actuating member effects said predetermined extent of movement of said fluid operated member.

9. The combination with an electric switch and a motive device therefor, of a control switch controlling said motive device, said motive device causing movement of said control switch to position to de-energize said motive device upon movement of said first-named switch by said motive device, and fluid-operated control mechanism responsive to successive movements of said first-named switch by said motive device for restraining said control switch in position preventing energization of said motive device.

10. The combination with an electric switch and a motive device therefor, of a control switch controlling said motive device, said motive device causing movement of said control switch to position to de-energize said motive device upon movement of said first-named switch by said motive device, fluid operated control mechanism responsive to successive movements of said first-named switch by said motive device for restraining said control switch in position preventing energization of said motive device, and means for determining the time within which said successive movements may effect said restraint of said control switch.

11. The combination with an electric switch and a motive device therefor, of a member controlling energization of said motive device, said motive device causing movement of said control member to position to de-energize said motive device upon movement of said switch by said motive device, and fluid-operated control mechanism responsive to successive movements of said switch by said motive device for re-restraining said control member in position preventing energization of said motive device.

12. The combination with an electric switch, means for restraining it in normal position, a motive device having a movable member for actuating said switch to normal position, and mechanism for controlling said motive device to prevent operation thereof, said mechanism comprising a fluid operated member and a fluid actuating member, a spring for actuating said fluid actuating member, and a member moved by said movable member of said motive device for storing energy in said spring and restrained by said restraining means in position to which moved in storing energy in said spring.

13. The combination with an electric switch, means for restraining it in normal position, a motive device having a movable member for actuating said switch to normal position, mechanism for controlling said motive device to prevent operation thereof, said mechanism comprising a fluid operated member and a fluid actuating member, a spring for actuating said fluid actuating member, a member moved by said movable member of said motive device for storing energy in said spring and restrained by said restraining means in position to which moved in storing energy in said spring, and a detent actuated by said fluid operated member after predetermined number of movements of said fluid actuating member to cause said detent to take a position to restrain said spring operating member.

14. The combination with a main switch, of means for restraining it in normal position, a motive device having a movable member for actuating said switch to normal position, a control switch controlling said motive device, said motive device causing movement of said control switch to position preventing energization of said motive device upon movement of said main switch to normal position, said movable member of said motive device upon actuation of said restraining means to free said main switch causing movement of said control switch to position to energize said motive device, and fluid operated control mechanism responsive to predetermined number of successive movements of said main switch for effecting restraint of said control switch in position preventing energization of said motive device.

15. The combination with a main switch, of means for restraining it in normal position, a motive device having a movable member for actuating said switch to normal position, a control switch controlling said motive device, said motive device causing movement of said control switch to position to deenergize said motive device upon movement of said main switch to normal position, a detent for restraining said control switch in said de-energizing position, a releasing member for actuating said detent to free said control switch upon actuation of said restraining means to trip said main switch, fluid operated control mechanism, and a detent controlled by said control mechanism to restrain said releasing member against actuation of said first named detent in response to predetermined number of successive operations of said main switch.

16. The combination with a main switch, of means for restraining it in normal position, a motive device having a movable member for actuating said switch to normal position, a control switch controlling said motive device, fluid operated control mechanism having a fluid operated member whose extent of movement is dependent upon the number of successive operations of said main switch, and means controlled by said fluid operated member for restraining said control switch in position preventing energization of said motive device after predetermined extent of movement of said fluid operated member.

17. The combination with a switch, of a spring for actuating it, a member for locking said switch, means for biasing said locking member to locking position, an actuating member for tensioning said spring, and a control member holding said locking member from its switch-locking position and actuated by said actuating member to free said locking member to lock said switch against actuation by said spring, said actuating member actuating said locking member to unlock said switch after said spring is tensioned.

18. The combination with a switch, of a spring for actuating it, a member for locking said switch, means for biasing said locking member to locking position, an actuating member for tensioning said spring, a control member holding said locking member from its switch-locking position and actuated by said actuating member to free said locking member to lock said switch against actuation by said spring, said actuating member actuating said locking member to unlock said switch after said spring is tensioned, and control mechanism comprising a spring operated by said actuating member, an operated member operated by said spring in response to successive operations of said actuating member, and a detent for restraining said control member after predetermined extent of movement of said operated member.

19. The combination with a switch, of a spring for actuating it, a detent for locking said switch in predetermined position, means for biasing said detent to switch-locking position, an actuating member for tensioning said spring, a control member movable to position to actuate said detent to unlock said switch upon movement of said actuating member in direction to tension said spring, whereby said switch is moved by said spring to a different position.

20. The combination with a switch, of a spring for actuating it, a detent for locking said switch in predetermined position, means for biasing said detent to switch-locking position, an actuating member for tensioning said spring, a control member movable to position to actuate said detent to unlock said switch upon movement of said actuating member in direction to tension said spring, whereby said switch is moved by said spring to a different position, and control mechanism comprising a detent for holding said control member in position preventing actuation of said first named detent, an operated member partaking of cumulative movements in response to successive movements of said actuating member, said operated member after predetermined extent of movement causing said second named detent to lock said control member.

21. The combination with a switch, of a spring for actuating it, a detent for locking said switch in predetermined position, means for biasing said detent to switch-locking position, an actuating member for tensioning said spring, a control member movable to position to actuate said detent to unlock said switch upon movement of said actuating member in direction to tension said spring, whereby said switch is moved by said spring to a different position, a spring actuated by said control member when actuated by reverse movement of said actuating member, and control mechanism comprising an operated member partaking of cumulative movements in response to successive operations of said second named spring, and a second detent for locking said control member to prevent actuation of said first named detent after predetermined extent of movement of said operated member.

22. Control mechanism comprising cylinders, fluid-actuating, and fluid-operated pistons in said cylinders, said cylinders communicating through a fluid passage, said fluid-operated piston partaking of cumulative movements in response to successive fluid-actuating movements of said fluid-actuating piston, a fluid reservoir, a passage from said reservoir to the cylinder containing said fluid actuating piston, means effecting retarded fluid flow from the other cylinder to said reservoir, and check valves in said passages preventing reverse flow of fluid from the cylinder containing said fluid-operated piston to the cylinder containing said fluid-actuating piston and from the cylinder containing said fluid-actuating piston to said reservoir, and a control member controlled by said fluid-operated piston.

23. Control mechanism comprising a cylinder containing a fluid-actuating piston, a cylinder containing a fluid-operated piston, said cylinders communicating through a passage, a control member controlled by said fluid-operated piston, co-axial shafts, crank arms secured to said shafts, and links connecting the crank arms to the respective pistons.

24. Control mechanism comprising a cylinder containing a fluid-actuating piston, a cylinder containing a fluid-operated piston, said cylinders being parallel and spaced apart and in communication with each other, co-axial shafts, crank arms on said shafts, links connecting said crank arms to the respective pistons, means for actuating one of said shafts for reciprocating said fluid-actuating piston, a crank arm actuated by said fluid-operated piston through the other of said shafts, and a control member controlled by said last named crank arm.

25. Control mechanism comprising a cylinder containing a fluid-actuating piston, a cylinder containing a fluid-operated piston, said cylinders being parallel and spaced apart, co-axial shafts, crank arms on said shafts, links connecting said crank arms to the respective pistons, means for actuating one of said shafts for reciprocating said fluid-actuating piston, a crank arm actuated by said fluid-operated piston through the other of said shafts, a control member controlled by said last named crank arm, a passage connecting said cylinders, and a check valve preventing reverse flow of fluid from the cylinder containing the fluid-operated piston to the other cylinder, whereby said fluid operated piston partakes of cumulative movements in response to successive movements of said fluid-actuating piston.

26. Control mechanism comprising a cylinder containing a fluid-actuating piston, a cylinder containing a fluid-operated piston, said cylinders being parallel and spaced apart, co-axial shafts, crank arms on said shafts, links connecting said crank arms to the respective pistons, means for actuating one of said shafts for reciprocating said fluid-actuating piston, a crank arm actuated by said fluid-operated piston through the other of said shafts, a control member controlled by said last named crank arm, a passage connecting said cylinders, a check valve preventing reverse flow of fluid from the cylinder containing the fluid-operated piston to the other cylinder, whereby said fluid-operated piston partakes of cumulative movements in response to successive movements of said fluid-actuating piston, a reservoir, means for effecting retarded fluid flow to said reservoir from the cylinder containing said fluid-operated piston, a passage from said reservoir to the piston containing the fluid-actuating piston, and a check valve preventing reverse flow of fluid from said last named cylinder to said reservoir.

27. The combination with an electric switch and a motive device therefor, of mechanism for controlling said motive device comprising a fluid-operated member, a control member controlling successive operations of said fluid-operated member in response to successive operations of said switch, means controlled by said fluid-operated member to prevent operation of said switch by said motive device, and electromagnetic means for controlling said means to permit operation of said switch by said motive device.

WILLIAM M. SCOTT.